United States Patent [19]

Kogan et al.

[11] Patent Number: 5,755,925
[45] Date of Patent: May 26, 1998

[54] BLEACHING RECYCLED PULP WITH OZONE AND HYDROGEN PEROXIDE

[75] Inventors: Jack Kogan, Skokie; Michel Muguet, Chicago, both of Ill.

[73] Assignee: L'Air Liquide, Societe Anonyme Pour L'Etude et L'Exploitation Des Procedes Georges Claude, Paris, France

[21] Appl. No.: 780,469

[22] Filed: Jan. 8, 1997

Related U.S. Application Data

[63] Continuation of Ser. No. 378,911, Jan. 26, 1995, abandoned, which is a continuation of Ser. No. 44,369, Apr. 6, 1993, abandoned.

[51] Int. Cl.$^6$ ............................................. D21C 5/02
[52] U.S. Cl. ........................... 162/6; 162/7; 162/65
[58] Field of Search ........................... 162/5, 6, 7, 65 B, 162/65

[56] References Cited

U.S. PATENT DOCUMENTS

| | | | |
|---|---|---|---|
| 3,663,357 | 5/1972 | Liebergott | 162/65 |
| 4,450,044 | 5/1984 | Fritzvold et al. | 162/65 |
| 5,073,301 | 12/1991 | Suess et al. | 162/6 |
| 5,211,809 | 5/1993 | Naddeo et al. | 162/6 |
| 5,464,501 | 11/1995 | Kogan et al. | 162/6 |

FOREIGN PATENT DOCUMENTS

| | | | |
|---|---|---|---|
| 3544398 | 6/1987 | Germany | 162/65 |

OTHER PUBLICATIONS

Lierop et al "Bleaching of Secondary Fiber Pulps" First Research Forum on Recycling, Toronto, Oct. 1991.

Angulo, "Environmentally Safe Bleaching of Post Consumer Waste Papers" TAPPI pulping conference, Oct., 1990.

Rothenberg et al "Bleaching of Oxygen Pulps with Ozone-"TAPPI, vol. 58, No. 8 Aug. 1975.

Henricson "New Generation Kraft Pulping and Bleaching Technology" Paperi ja Puu, Apr. 1992.

"Ozone Bleaching of Recycled Paper" by Michel Muguet and Jack Kogan, presented at the 1992 Pulping Conference, Proc. Pulping Conf., vol. 1, pp. 75–80; Nov. 1–5,1992.

*Primary Examiner*—Karen M. Hastings
*Attorney, Agent, or Firm*—Malcolm B. Wittenberg

[57] ABSTRACT

A method of bleaching recycled paper containing pulp wherein said pulp is contacted with ozone in an ozone stage (Z) treatment with a brightness stabilizing step during or at the end of said ozone stage (Z), said stabilizing step consisting of contacting a small amount of hydrogen peroxide with said pulp, the amount of hydrogen peroxide contacted with said pulp being small compared to the amount of hydrogen peroxide usually in an hydrogen peroxide stage, no washing step of the pulp being provided between the ozone contacting step with said pulp and the hydrogen peroxide contacting step. The pulp is first submitted to a test procedure to determine whether the pulp is more reactive to ozone in acidic or alkaline conditions, and if necessary the pH is accordingly adjusted.

14 Claims, No Drawings

BLEACHING RECYCLED PULP WITH OZONE AND HYDROGEN PEROXIDE

This is a continuation of application Ser. No. 08/378,911 filed on Jan. 26, 1995 entitled "BLEACHING RECYCLED PULP WITH OZONE AND HYDROGEN PEROXIDE", now abandoned, which is a continuation of Ser. No. 08/044,369 filed Apr. 6, 1993, now abandoned.

TECHNICAL FIELD OF INVENTION

The present invention deals with a method of improving the efficiency of ozone in bleaching pulp generated from waste paper.

BACKGROUND OF THE INVENTION

As society becomes increasingly environmentally conscious, there has been a growing trend to recycle a wide variety of consumable products including newspapers and other wood pulp-based materials.

Deinked waste fiber from chemical pulp products has been usually bleached by chlorine-based compounds, specifically chlorine and sodium hypochlorite. However, the industry starts moving away from chlorine for environmental concerns and this trend has been perceived as well in the recycled paper industry. Sodium hypochlorite is also perceived to be a chlorine compounds producer in effluent streams and air emissions and, as a result, is also an environmental concern. As such, there is now a growing interest to use ozone and/or hydrogen peroxide in the bleaching of recycled pulps.

It is known, for example, from "Cellulose Chemistry and Technology," 23-307-319 (1989) to bleach pulp with ozone. However, ozone degradates cellulose which consequently generates an important decrease of the polymerization degree of said cellulose which in turn decreases mechanical strength of the pulp.

In the article entitled "Upgrading of Waste Paper with Hydrogen Peroxide," O. Helmling, *Recycling Paper from Fiber to Finished Products*, pg. 714–724, is disclosed the upgrading of pulp from waste paper with hydrogen peroxide added during repulping; otherwise, the pulp will yellow particularly under alkaline conditions. Alkaline repulping is usually considered as being necessary for dissolving the pulp fiber structure and for dislodging ink particles from fibers by the swelling process.

However, it is necessary to stabilize hydrogen peroxide when it is added to the pulp, because hydrogen peroxide might be decomposed and/or consumed by organic fine material found in waste paper and/or dilution water. In early deinking processes carried out with hydrogen peroxide, up to 5% sodium silicate was added to the pulp as a stabilizer. However, because of scaling-up problems and reduced efficiency of the retention aids for paper manufacture, a number of chelating agents were developed as substitutes for sodium silicate as a stabilizer for hydrogen peroxide, as disclosed by Indresh Mathur in "Chelant Optimization in Deinking Formulation," 1*st Research Forum on Recycling*, October 1991, pgs. 1–7. In any event, regardless of the stabilizer employed, it is believed to be necessary by the person skilled in the art to use some stabilizer for hydrogen peroxide particularly in light of the problems referred to previously.

Presently, and as disclosed in the article entitled "Alternative Methods for Bleaching Post Consumer Waste Papers" J. E. Angulo, August 1991, TAPPI Journal, there is a need for environmental-friendly process to bleach recycled pulp.

It is know also to use ozone for bleaching of recycled pulp as disclosed by B. Van Lierop and N. Liebergott in an article entitled "Bleaching of secondary fibre pulp". First Research Forum on Recycling—Toronto Oct. 29–31, 1991—p. 175–182.

In this article it is suggested to combine a Z stage with other stages such as an hypochlorite stage (H), a sodium hydrosulfite stage (Y) or a formamidine sulphinic acid stage (FAS) or an hydrogen peroxide stage (P). One of the conclusions of this article is that the combination of a Z and Y stages gives better results in terms of brightness gain than the combination of Z and H stages which in turn is better than a combination of Z and P stages. At this point, it should be understood that all of these sequences such as the ZH sequence disclosed in the above article, as explained in the TAPPI publication Tis 0606-021—issued 1988—entitled "Recommended pulp bleaching stage designation method", comprise two separate stages, a Z stage and an H stage with a washing or a pressing step between those two stages (first page - right column). When those two stages are not separated by such washing or pressing steps, they are designated as Z/H while when ozone and hypochlorite stages are done simultaneously the sequence is designated as (Z+H)—see FIG. 7; when Z and H are added sequentially with mixing in between points of additions, but with no washing or pressing and before a common retention tower, the sequence is designated as (ZH)—see FIG. 10.

It is also disclosed in EP 514,901 a method to remove color from a recycled pulp made of waste papers to contact said pulp with oxygen or an oxygen containing gas which oxygen reacts with the color-causing compounds present in said pulp thereby bleaching said recycled pulp to make a recycled paper product. This oxygen bleaching step already well-known from the literature, might be followed by subsequent steps comprising (Z) ozone, hydrogen peroxide (P), etc. Prior to this oxygen stage or after, the pH of the pulp might be adjusted either at low pH or at high pH, avoiding the 8–10 pH zone. Subsequent Z, P, H stages might be provided.

The results indicate a slight bleaching action of oxygen alone, which action is enhanced by further stages, already known for their bleaching actions. The brightness obtained (which is not indicated whether it is prior to or after reversion) is rarely above 80, usually with long sequences.

From the disclosure of the above prior art, it appears that there is still a need today of relatively simple bleaching sequences on recycled pulp with a good brightness of the pulp after reversion and without using chlorine based stages.

SUMMARY OF THE INVENTION

The invention relates to a method of bleaching recycled paper containing pulp wherein said pulp is contacted with ozone in an ozone stage (Z) treatment comprising a stabilizing step during or at the end of said ozone stage (Z), said stabilizing step consisting of contacting hydrogen peroxide with said pulp, the amount of hydrogen peroxide contacted with said pulp being small compared to the amount of hydrogen peroxide usually used in an hydrogen peroxide stage. No washing step of the pulp is provided between contacting ozone and hydrogen peroxide with the pulp. Preferably the weight amount of $H_2O_2$ is less than 0.5% and range between 0.1% to 0.3% of the weight amount of pulp (which amount is small compared to the usual amount of $H_2O_2$ in a usual P stage which ranges between 1% and 2% of the weight amount of pulp).

According to the definition of the TAPPI data sheet discussed hereabove, the invention comprises (Z/P), (Z+P)

or (ZP) sequences, but not the ZP sequence (including a washing step between Z and P) as far as the amount of $H_2O_2$ is outside the range defined hereabove. For simplicity, the designation Z/P will be used herein to define the above sequences according to the invention.

More remarkably, it has been found that it was not necessary to provide protectors such as DTPA or silicates to prevent $H_2O_2$ decomposition in the Z/P stage according to the invention (this sequence without such protectors will be further designated Z/P-). However, it is always possible to add those protectors, if necessary, to sometimes enhance the brightening effect of this Z/P- sequence.

According to a preferred embodiment of the invention, a preacidification stage before the Z/P sequence gives improved results regarding the brightness of the pulp. Usually, when it is used, this preacidification step will be carried out with acids such as sulfuric acid, oxalic acid, or their mixtures to reach a Ph preferably between 2 and 3, more preferably about 2.5. It is believed that this preacidification step allows to solubilize metal ions which might be present in the pulp. As this acidification step takes place in a medium consistency pulp, a subsequent dewatering and/or washing step helps to remove the solubilized metal ions which are supposed to create some decomposition of the hydrogen peroxide.

Whether a preacidification step has been applied or not, it has been also discovered that the ozone stage could be carried out at a non adjusted Ph which is the pH of the recycled pulp after the previous treatments. However it is preferred to make this Z stage treatment at a pH which is either acidic, preferably lower than 4, and preferably comprised between about 2 and 3, while about 2.5 seems to be the preferred value or alkaline and preferably between about 9 to 11.

It has been also determined that according to the type of recycled pulp, which composition can greatly vary according to the dyes still present in said pulp, better results (increased brightness) were obtained with a Z treatment either in acidic conditions or in alkaline conditions. To determine which pH conditions are the best for a recycled pulp, the following test is first carried out on the recycled pulp when this one is made or received:

Three samples of pulp having a weight between 40 to 100 g. are prepared. Each sample is diluted with distilled water to 1% consistency. Then the pH of each sample is adjusted:

Sample 1: pH 2.5
Sample 2: pH 7.0
Sample 3: pH 10.5

The samples are then dewatered in preparation for next Z stages. Then high consistency samples are made from those three samples, which are contacted with ozone (1% by weight of the pulp) during e.g. 6 minutes.

Then handsheets of every sample are made to measure the BRIGHTNESS of each sample.

The highest BRIGHTNESS obtained indicates the proper pH to be implemented on the pulp during the ozone bleaching process according to the invention.

Of course any usual stage can be applied to the pulp either before the Z/P or AZ/P sequence (A means preacidification followed by dewatering and/or washing) or after said sequence.

Before said Z/P or Z/P- or AZ/P or AZ/P- sequence, the brightness can be improved if either a Y stage or a FAS stage is applied. (A Y stage is defined as a Sodium Hydrosulfite stage, while a FAS stage means applying Formamidine Sulfinic Acid stage.)

Following the Z/P or AZ/P or Z/P- or AZ/P- sequence it is possible to provide various sequences to improve the pulp brightness such as a P stage (with prior washing or pressing step) or any of the Z, P, H, Y FAS, etc., usual stages, either alone or in combination with one or several others, similar or different.

DETAILED DESCRIPTION OF THE INVENTION

As disclosed hereabove, the invention is essentially based on the unexpected results obtained with an ozone bleaching stage wherein a small amount of hydrogen peroxide is added to the pulp during or at the end of the Z stage, preferably with a prior acidification step. The different steps of this stage are disclosed hereunder in greater details:

Acidification

Acid is added to the pulp to reach a pH between 2 and 3, preferably 2.5. At this point, low or medium consistency may be used. Acids as oxalic, sulfuric and others can be used for this purpose. The use of sulfuric acid is particularly efficient when the acidic step is carried out at temperatures between 50° and 90° C. Oxalic acid performs well at room temperature (20°–25° C.).

Dewatering

After acidification, the sample is dewatered to remove undesirable metal ions. Also, a regular washing step will help to remove ions from the pulp. The degree of dewatering-washing will be dependent on the type of technology (high, medium or low consistency) that would be used in the next ozone stage. For example, if the ozone treatment is carried out at high consistency (35–45%), the excess of water present in the furnish during acidification has to be removed using regular equipment (twin press, etc.).

Ozone (Z) Stage

High or medium consistency technology can be used to apply ozone to the pulp. High consistency requires the pulp to be fluffed. The concentration of ozone in a carrier gas (e.g. oxygen) may vary according to the type of ozone generator. Pressure of the gas is about 1.5 atm. Temperature of the reaction ranges from 10° to 60° C. Higher temperatures may decompose ozone, making the reaction less efficient. Reaction time is short, and varies according to reactors configuration.

On the other hand, medium consistency technology requires fluidization of the pulp. Gas is pressurized at about 6 atmospheres and injected to a fluidizer-mixer-reactor. Retention time may vary according to general configuration of the equipment and is also very short.

For medium or high consistency, the charge of ozone may vary according to the targeted brightness. When treating recycled wood-free pulp, the charge of ozone on dry pulp ranges between 0.3 and 1.5% by weight of pulp. As mentioned hereabove, this ozone stage according to the invention comprises also contacting the pulp with a small amount of hydrogen peroxide which ranges usually between 0.1% to 0.3% by weight of pulp.

Ozone is usually contacted with the pulp as a mixture with oxygen or any other suitable carrier gas. Usually the mixture comprises 0.1% to 14% by weight of $O_3$ in the carrier gas, and preferably between 0.1% to 10% by weight of ozone in the carrier gas, based on oxygen as the carrier gas (the proportion by weight being different with a carrier gas having a molecular weight different from that of oxygen).

The injection of hydrogen peroxide should take place immediately after the pulp reacted with ozone. In the case of high consistency ozone bleaching, hydrogen peroxide may be introduced in a mixer at the discharge of the reactor, following the injection of alkali necessary to bring the pH of the pulp to about 11.0. Similarly, at medium consistency, peroxide can be injected in a fluidizing mixer after the pulp is separated from the reaction gases from the ozone stage. According to the invention, no washing nor dewatering are needed between the ozone reactor and the injection of alkali and hydrogen peroxide.

Peroxide (P) Stage

After the Z/P stage according to the invention, a P stage can be carried out, preferably if acidification has been carried out before the Z/P stage. Since metal ions were already removed in certain extent by the acidification step, the P stage does not require protectors such as DTPA or silicates to prevent $H_2O_2$ decomposition and to make the stage more efficient. Peroxide (preferably 0.1–1.0% by weight of dry pulp) is applied to the pulp at a temperature preferably between 50°–70° C., during preferably about 45–120 min. retention time, adjusting the pH of the furnish to about 11 with NaOH. This is a simplified P stage because it does not require additives nor long retention time, nor high temperatures to achieve excellent performance.

Also, according to the invention, the ozone is injected in the pulp either as a mixture of ozone and oxygen, usually directly from the ozonator or, as a mixture of ozone and another carrier gas, usually an inert gas such as nitrogen. However, any other inert gas can be used such as argon, helium, xenon, krypton, neon and/or carbon dioxide or any mixtures thereof. Such mixtures are prepared by separating ozone from oxygen at the output of the ozonator, e.g. with a cryogenic trap and then desorbing the ozone with the other gas or gas mixture.

Also, according the invention, the percentage by weight of ozone in the gas mixture can be varied (as far as the technique to produce ozone permits) within a large range, usually between 1% to 12% or more if the technique is available, preferably between the effective bleaching amount which is usually at least 0.1% by weight of dry pulp to about 7–8% or more if the technique is available.

In the following examples, all chemical charges are expressed in % by weight of chemical on dry pulp. For example, 1% of ozone on pulp means 1 gram ozone per 100 grams of dry pulp or 10 kg per metric ton of dry pulp, etc.

Examples 1 to 4

The foregoing examples evidence the effect of an acidification step before a Z P sequence. Deinked pulp (40 g) containing less than 4% of mechanical pulp and having an initial brightness of 66.4% ISO was diluted with water at 50° C. to reach a 2.5% consistency (low consistency). Two samples (1 and 2) of this pulp were acidified with sulfuric acid to obtain a pH of 2.5. These two samples were further dewatered to a consistency of about 38% (high consistency), the pulp being then fluffed using a laboratory fluffer.

Two other samples (3 and 4) of the same pulp were not submitted to acidification prior to the same dewatering and fluffing treatment, to make fluffed pulp samples (3 and 4) having substantially the same consistency as the preacidified fluffed pulp samples (1 and 2).

Each sample was then placed in a rotary evaporator and ozone gas produced by a 7 g/hour ozone generator was then injected in said evaporator. (The ozone generator produces ozone according to a well known method from the artisan from an oxygen flow. The gaseous stream from said ozone generator usually contains less than 10% by weight of ozone in oxygen and usually by 3% to 4% by weight. The mixture of oxygen and ozone is of course injected in the evaporator.) The amount of ozone injected was determined by the injection duration and according to ozone concentration. Said ozone concentration is measured by iodometric titration of a KI solution contained in a gas washing bottle that collects the outlet gases of the system. The ozone rate of production is then determined as mg of ozone per minute. The ratio of the weight of ozone and the weight of dry pulp was 1.0%, the injection duration being about 6 minutes.

Thereafter each of the four samples was diluted in an aqueous solution of 12% consistency and 0.5% of NaOH was added to said aqueous solution to reach a pH of 11.

Hydrogen peroxide (0.7%), 2% silicate and 0.2% DTPA were added to one preacidified sample (No. 1) and one non-preacidified sample (No. 3).

Hydrogen peroxide (0.7%) without the above mentioned additives was added to the two other samples (No. 2 and 4). For all four samples this peroxide (P) step lasted 45 minutes after which the pulp in each sample was tested. The ISO brightness of each sample was measured after the Z step and after the P step.

Brightness of the samples obtained after reversion test are summarized in the following table:

| | | | ISO BRIGHTNESS % | | |
|---|---|---|---|---|---|
| SAMPLE # | SEQUENCE | A | Z (1.0%) | P(−) .7% | P(+) .7% |
| 1 | a Z P(+) | X | 75.8 | — | 81.0 |
| 2 | a Z P(−) | X | 75.8 | 80.4 | — |
| 3 | Z P(+) | only w | 75.0 | — | 79.8 |
| 4 | Z P(−) | only w | 75.0 | 79.1 | — | with:
X: acidification "A" performed
only w: only washing performed
P(−): Peroxide stage without additives (DTPA, Silicates)
P(+): Peroxide stage with additives (DTPA, Silicates)
(DTPA means diethylenetriaminepentacetic acid)

It is clear that acidification makes the sequence Z P more efficient (compare samples 1–2 with samples 3–4). Also, it seems evident that acidification produces better results than the addition of protectors for hydrogen peroxide (compare samples 2 and 3). It should be noted that an improvement of ISO brightness of 0.5% to 1% is already a very significant improvement in the brightness of a pulp.

Examples 5 to 14

Following examples have been carried out in similar conditions as those used in the above examples, except otherwise indicated. Various treatments at the same conditions have been applied to the same pulp in order to evidence improvement according to the invention. In the following examples the pulp has been submitted to the test procedure disclosed herein and the pulp used responded better to an ozone treatment when the stage is carried out at an alkaline pH.

Fluorescence of the sample is designated as Fl.

L, a and b are different values measured which characterize certain colors of the sample, as usually used by the man skilled in the art and defined in FIG. 3 of B. Van Lierop and N. Liebergott publication referred to hereabove.

A means an acidification step at pH 2.5 followed by dewatering of the pulp.

Zn is an ozone stage at not adjusted pH (pH of 8.5 in the present case).

Za is an ozone stage at pH 2.5.

Zb is an ozone stage at pH 10.

The ozone consumption was 0.5% by weight of the weight of the pulp, except for sample (5) wherein 1% ozone was used. P- indicates 0.1% by weight of $H_2O_2$ based on the weight of pulp, without additives.

The retention time RT was 15 minutes and the temperature to carry out all of these stages was 50° C. The ozone was injected in the pulp with oxygen as a carrier gas, the gas mixture comprising 3.5% by weight of ozone and 96.5% by weight of oxygen. The duration of the contact between ozone and pulp was about 3 minutes to have 0.5% of ozone and was about 6 minutes to have 1% of ozone based on dry pulp weight. Of course, nitrogen gas or any inert gas can replace $O_2$ with similar results.

The initial values for the samples mentioned in the following table were:

Initial brightness: 79.1
Initial Fluorescence: 1.585
Initial L: 91.3
Initial a: +0.2
Initial b: +0.4

The following results are obtained:

| SEQUENCE sample # | FNL BR. | FNL RV.BR | d RV BR. | FL | L | a | b |
|---|---|---|---|---|---|---|---|
| Zn (5) | 83.5 | 80.5 | 3.0 | 0.86 | 94.0 | −0.6 | +1.9 |
| Zn/P− (6) | 86.1 | 83.7 | 2.4 | 0.94 | 95.2 | −0.6 | +1.8 |
| A Za (7) | 83.0 | 80.0 | 3.0 | 0.58 | 93.9 | −0.5 | +2.2 |
| Zb (8) | 83.8 | 80.6 | 3.2 | 0.80 | 94.1 | −0.7 | +1.7 |
| Zb1% (9) | 85.5 | 81.9 | 3.6 | 0.67 | 95.0 | −0.7 | +1.9 |
| Zb/P− (10) | 86.6 | 84.3 | 2.3 | 0.96 | 95.3 | −0.6 | +1.4 |
| AZb/P− (11) | 87.0 | 85.0 | 2.0 | 0.72 | 95.2 | −0.5 | +1.2 |
| A Zb (12) | 84.3 | 81.6 | 2.7 | 0.76 | 94.4 | −0.6 | +1.6 |
| A Ob (13) | 79.2 | 78.6 | 0.6 | 1.61 | 90.3 | 0.0 | +1.3 |
| A Ob/P− (14) | 82.1 | 80.4 | 1.7 | 1.79 | 93.1 | 0.1 | +1.4 |

A: Acidification to pH 2.5 and dewatering
Za: ozone stage at pH 2.5
Zn: ozone stage at not adjusted pH (approx. 8.5)
Zb: ozone stage at pH 10
Ob: pulp treated only with oxygen without ozone at pH 10
Z consumption : 0.5%
Z consumption on sample 5: 1.0%
P−: $H_2O_2$ 0.1%, no additives, RT: 15' Temp. 50° C.—Preferably NaOH is added to the pulp to adjust its pH to about 11.

Notice that samples 9 and 10 were treated with pure oxygen (no ozone), under exactly the same conditions as ozone in the other examples: the oxygen as a carrier gas was sent to the ozonator, but the ozonator was shut off, i.e. no ozone was produced. The treatment was applied to the sample, under alkaline or acidic conditions during the same exposure time, (about 3 minutes) and at room temperature, as the samples treated with ozone (1–8).

The results clearly indicate that oxygen takes no part in the bleaching process when a mixture of oxygen and ozone is contacted with the pulp according to the process of the invention.

ANALYSIS OF RESULTS

Comparison between sequences that include a final addition of peroxide or simplified P- stage

BRIGHTNESS BEFORE REVERSION

| Sequence | A Zb/P− | > | Zb/P− | > | Zn/P− |
|---|---|---|---|---|---|
| Brightness | 87 | > | 86.6 | > | 86.0 |

BRIGHTNESS AFTER REVERSION

| Sequence | A Zb/P− | > | Zb/P− | > | Zn/P− |
|---|---|---|---|---|---|
| Brightness | 85.0 | > | 84.3 | > | 83.7 |

Comparison of sequences comprising an ozone stage (but no peroxide added at the end of the Z stage

BRIGHTNESS BEFORE REVERSION

| Sequence | A Zb | > | Zb | > | Zn | > | Za |
|---|---|---|---|---|---|---|---|
| Brightness | 84.3 | > | 83.8 | > | 83.5 | > | 83.0 |

Note:
pH Zb: 10.0
pH Zn: 8.5

BRIGHTNESS AFTER REVERSION

| Sequence | A Zb | > | Zb | >= | Zn | > | Za |
|---|---|---|---|---|---|---|---|
| Brightness | 81.6 | > | 80.6 | >= | 80.5 | > | 80.0 |

Note:
pH Zb: 10.0
pH Zn: 8.5

REMARK: Sample 5 is a "Zb" stage in which the consumption of ozone was set on 1.0% (twice the consumption of the other samples). Notice that although the brightness achieved is high (85.5%), the brightness after reversion is high as well (3.6 points).

BRIGHTNESS STABILITY

According to the invention, a small addition of hydrogen peroxide (0.1% on pulp) following immediately the Z stage stabilizes and improves the brightness of the pulp (samples 2, 6 and 7).

According to the invention, the peroxide addition can take place at the discharge of the ozone reactor and does not require stabilizers (DTPA, silicate, etc.) nor long retention time or high temperatures.

FLUORESCENCE

All the ozone treatments decreased fluorescence values. However, it is known that peroxide addition increases fluorescence of pulp. The sequence A Zb/P− was able to produce the best results among the ozone-peroxide sequences, comparable to samples to which $H_2O_2$ was not added.

L a b VALUES (color coordinates)

All treatments reached similar L and a values. The highest were produced by peroxide including sequences.

All treatments increased the b value to certain extent. The +b value indicates yellow component of pulp's color. The A Zb/P− sequence produced the lowest results (ideally, b=0 indicates absence of yellow).

Examples 15 to 18

In this case, contrary to the preceding examples, the initial test indicated that better results should be obtained in acidic conditions for the Z sequence.

In the following examples, A indicates an acidification stage, AZ an acidification stage followed by an ozone stage in acidic conditions, bZ means that the ozone stage is carried out at an alkaline pH (whether or not A was carried out before) and Z/P– means that the ozone stage is followed according to the invention by an addition of a low amount of hydrogen peroxide without additives and with no washing or dewatering in between.

| STAGE | | ISO BRIGHTNESS % | REVER. ISO BRIGHT. % |
|---|---|---|---|
| INI. BRIGHTNESS: 72.7  OZONE CONSUMPTION: 0.5% | | | |
| INITIAL REVER. BRIGHT: 71.9  $H_2O_2$ CHARGE : 0.1% | | | |
| A Z | (15) | 80.2 | 78.7 |
| A Z / P– | | 83.3 | 82.1 |
| b Z | (16) | 79.5 | 77.8 |
| b Z / P– | | 81.3 | 79.8 |
| A b Z | (17) | 80.2 | 78.6 |
| A b Z / P– | | 83.2 | 81.8 |
| n Z | (18) | 79.3 | 77.6 |
| n Z / P– | | 81.1 | 79.6 |

A : pH 2.5
b : pH 10

(The initial test indicated that acidic conditions for Z treatment are better.)

The comparison between 15 and 17 indicates that the sequences A Z or A b Z are similar: after an acidification stage A, a Z stage can be applied under acidic or alkaline conditions. However, comparison between 16 and 17 indicate that if the sample is not preacidified, then the Z treatment in alkaline conditions (b) is not as good as a Z treatment with a previous acidification stage A (followed by washing or dewatering as the upper case A indicates).

From the above examples 5 to 16, it can be concluded that b does not have a negative effect and might, on the contrary, have some positive effects.

The examples given hereabove relate to the bleaching of pulp made from recycled paper. But the same sequences such as Z/P– or A Z/P–, etc., can be applied also to pulp mixtures comprising only a portion of pulp made of recycled paper, the rest being virgin pulp. The proportions of recycled and fresh pulp can vary according to the final quality (including but not limited to brightness) of the pulp which is desired.

We claim:

1. A method of bleaching recycled paper containing pulp consisting of submitting said pulp to a test procedure to determine whether the pulp is more reactive to ozone in acidic or in alkaline conditions, if necessary adjusting the pH of said pulp to acidic or alkaline pH depending upon whether the pulp is shown to be more reactive to ozone in acidic or alkaline conditions, contacting said pulp with ozone in an ozone stage treatment including a brightness stabilizing step consisting of contacting said pulp with hydrogen peroxide in an amount between approximately 0.1 to 0.3% by weight based upon the weight of dry pulp.

2. A method consisting of the steps of claim 1 and an acidification stage (A) provided before the ozone stage (Z/P).

3. A method according to claim 2, wherein the acid used in said acidification stage is selected from the group consisting of sulfuric acid, oxalic acid and their mixtures.

4. A method according to claim 2, wherein the pH of the pulp solution after the acidification stage is between 2 and 3.

5. A method according to claim 4, wherein the pH of the pulp solution after the solidification stage is about 2.5.

6. A method according to claim 1, wherein the ozone stage is performed at a pH which is less than 4.

7. A method according to claim 1, wherein the pH of the ozone stage is greater than 7.

8. A method according to claim 1, wherein the ozone is contacted with the pulp as a mixture comprising a carrier gas and ozone.

9. A method according to claim 8, wherein the $O_3$ concentration in the gas mixture is between 0.1% and 14% by weight of ozone in the carrier gas.

10. A method according to claim 9, wherein the mixture includes between 0.1% to 10% by weight of ozone in the carrier gas.

11. A method according to claim 1, wherein the charge of ozone on dry pulp ranges between 0.3% and 1.5% by weight of dry pulp.

12. A method according to claim 9, wherein the carrier gas is selected from the group consisting of oxygen, nitrogen, argon, krypton, xenon, neon, helium, carbon dioxide and their mixtures.

13. A method of bleaching recycled paper containing pulp consisting of submitting said pulp to a test procedure to determine whether the pulp is more reactive to ozone in acidic or in alkaline conditions, if necessary adjusting the pH of said pulp to acidic or to alkaline pH depending upon whether the pulp is shown to be more reactive to ozone in acidic or in alkaline conditions, contacting said pulp with ozone in an ozone stage treatment including a brightness stabilizing step consisting of contacting said pulp with hydrogen peroxide in an amount between approximately 0.1 to 0.3% by weight based upon the weight of the pulp and wherein said pulp is contacted with sodium hydrosulfite before and/or after the carrying out of the ozone stage.

14. A method of bleaching recycled paper containing pulp consisting of submitting said pulp to a test procedure to determine whether the pulp is more reactive to ozone in acidic or in alkaline conditions, if necessary adjusting the pH of said pulp to acidic or to alkaline pH depending upon whether the pulp is shown to be more reactive to ozone in acidic or in alkaline conditions, contacting said pulp with ozone in an ozone stage treatment including a brightness stabilizing step consisting of contacting said pulp with hydrogen peroxide in amount between approximately 0.1 to 0.3% by weight based upon the weight of the dry pulp and wherein said pulp is contacted with formamidine sulfinic acid before and/or after the carrying out of the ozone stage.

* * * * *